US011360823B2

(12) United States Patent
Vemulapati et al.

(10) Patent No.: US 11,360,823 B2
(45) Date of Patent: Jun. 14, 2022

(54) PREDICTING AND SCHEDULING A FREQUENCY OF SCANNING AREAS WHERE OCCURRENCES OF AN ACTUAL STATE OF A CLOUD ENVIRONMENT DEPARTING FROM A DESIRED STATE ARE HIGH

(71) Applicant: Accenture Global Solutions Limited, Dublin (IE)

(72) Inventors: Jayanti Vemulapati, Mumbai (IN); Murtuza Chitalwala, Mumbai (IN)

(73) Assignee: Accenture Global Solutions Limited, Dublin (IE)

( * ) Notice: Subject to any disclaimer, the term of this patent is extended or adjusted under 35 U.S.C. 154(b) by 408 days.

(21) Appl. No.: 16/527,243

(22) Filed: Jul. 31, 2019

(65) Prior Publication Data
US 2020/0042360 A1 Feb. 6, 2020

(30) Foreign Application Priority Data
Aug. 3, 2018 (IN) .............................. 201811029312

(51) Int. Cl.
*G06F 9/50* (2006.01)
*G06F 16/9035* (2019.01)
(Continued)

(52) U.S. Cl.
CPC .......... *G06F 9/5072* (2013.01); *G06F 9/5005* (2013.01); *G06F 16/9035* (2019.01); *G06F 16/986* (2019.01); *G06F 9/4881* (2013.01)

(58) Field of Classification Search
CPC .. G06F 9/5072; G06F 9/5005; G06F 16/9035; G06F 16/986; G06F 9/4881; H04L 41/5012
(Continued)

(56) References Cited

U.S. PATENT DOCUMENTS 9,521,151 B2 * 12/2016 Kinsella .............. H04L 41/0813
10,496,530 B1 * 12/2019 Angermayer ....... G06F 11/3692
(Continued)

FOREIGN PATENT DOCUMENTS

CN 107959689 A * 4/2018

OTHER PUBLICATIONS

Han et al., CN107959689A Description Translation, Apr. 24, 2018, [database online], [retrieved on Nov. 5, 2021] Retrieved from Espacenet using Internet <URL:https://worldwide.espacenet.com/publicationDetails/description?CC=CN&NR=107959689A&KC=A&FT=D&ND=3&date=20180424&DB=&locale=en_EP<, pp. 1-12 (Year: 2018).*

(Continued)

*Primary Examiner* — Meng Al T An
*Assistant Examiner* — Hsing Chun Lin
(74) *Attorney, Agent, or Firm* — Fish & Richardson P.C.

(57) ABSTRACT

Implementations include actions of receiving, by an intelligent quality assurance (iQA) platform, a desired state (DS) file including data indicative of a desired state of a cloud computing environment, triggering, by the iQA platform, an auto-discovery process to provide an actual state of the cloud computing environment based on cloud resources instantiated within the cloud environment, and application resources executing within the cloud environment, the auto-discovery process including retrieving first credentials to enable automated access to the cloud computing environment, determining, by the iQA platform, a delta between the actual state, and the desired state, and providing, by the iQA platform, a report including the delta.

18 Claims, 4 Drawing Sheets

(51) Int. Cl.
    *G06F 9/48*     (2006.01)
    *G06F 16/958*     (2019.01)

(58) Field of Classification Search
    USPC .......................................................... 718/104
    See application file for complete search history.

(56) References Cited

U.S. PATENT DOCUMENTS

| | | | |
|---|---|---|---|
| 10,984,112 B2* | 4/2021 | Agarwal | G06F 21/566 |
| 2006/0222008 A1 | 10/2006 | Aaron et al. | |
| 2013/0019242 A1* | 1/2013 | Chen | H04L 43/50 |
| | | | 718/1 |
| 2013/0060933 A1* | 3/2013 | Tung | H04L 41/5025 |
| | | | 709/224 |
| 2013/0247136 A1 | 9/2013 | Chieu et al. | |
| 2014/0280805 A1 | 9/2014 | Sawalha | |
| 2016/0294856 A1* | 10/2016 | Boia | H04L 63/1425 |
| 2016/0366233 A1* | 12/2016 | Le | H04L 41/0866 |
| 2018/0095739 A1* | 4/2018 | Baset | G06F 21/6218 |

OTHER PUBLICATIONS

EP Search Report in European U.S. Appl. No. 19188717, dated Dec. 9, 2019, 9 pages.

* cited by examiner

PREDICTING AND SCHEDULING A FREQUENCY OF SCANNING AREAS WHERE OCCURRENCES OF AN ACTUAL STATE OF A CLOUD ENVIRONMENT DEPARTING FROM A DESIRED STATE ARE HIGH

CROSS-REFERENCE TO RELATED APPLICATION

This application claims priority under 35 U.S.C § 119 to Indian Patent Application No. 201811029312, filed on Aug. 3, 2018, the entire contents of which is incorporated herein by reference.

BACKGROUND

Cloud-based systems (e.g., public clouds, private clouds, hybrid clouds) provide shared infrastructure for computing resources, and applications. Such environments include dynamic provisioning of infrastructure resources, and application deployments. However, for each client accessing a cloud-based environment, a state of the environment should be a desired state. That is, resources, applications, and the like, should be configured and operating as expected for the particular client.

Validation of the desired state of the environment is a resource intensive, and time-consuming task that is not scalable, and is prone to error. For example, traditional techniques for validation of an environment can take hours to weeks, consuming computing resources to perform the validation, and introducing error that can result in downstream inefficiencies.

SUMMARY

Implementations of the present disclosure are generally directed to computer-implemented systems for auto-discovery of an actual state of a cloud environment, and validating the actual state against a desired state. More particularly, implementations of the present disclosure are directed to automatic discovery of an infrastructure state and an application state of the cloud environment for validation against desired states, as well as predicting whether one or more portions of the cloud environments are to be tested.

In some implementations, actions include receiving, by an intelligent quality assurance (iQA) platform, a desired state (DS) file including data indicative of a desired state of a cloud computing environment, triggering, by the iQA platform, an auto-discovery process to provide an actual state of the cloud computing environment based on cloud resources instantiated within the cloud environment, and application resources executing within the cloud environment, the auto-discovery process including retrieving first credentials to enable automated access to the cloud computing environment, determining, by the iQA platform, a delta between the actual state, and the desired state, and providing, by the iQA platform, a report including the delta. Other implementations of this aspect include corresponding systems, apparatus, and computer programs, configured to perform the actions of the methods, encoded on computer storage devices.

These and other implementations can each optionally include one or more of the following features: the auto-discovery process further includes receiving second credentials that enable automated access to one or more applications, and/or application servers of the cloud environment, the one or more applications, and/or application servers being identified based on auto-discovery of cloud resources within the cloud environment based on the first credentials; the first credentials and the second credentials are stored in and retrieved from a vault service; the first credentials are retrieved based on data provided in the DS file; the auto-discovery process is triggered in response to one of a schedule, an occurrence of an event, and receipt of the DS file; actions further include parsing the DS file to provide a desired state database table, wherein the desired state database table is compared to an actual state database table resulting from the auto-discovery process to determine the delta; and the DS file includes a Javascript object notation (JSON) file.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Like reference symbols in the various drawings indicate like elements.

DETAILED DESCRIPTION

Implementations of the present disclosure are generally directed to computer-implemented systems for auto-discovery of an actual state of a cloud environment, and validating the actual state against a desired state. More particularly, implementations of the present disclosure are directed to automatic discovery of an infrastructure state and an application state of the cloud environment for validation against desired states, as well as predicting whether one or more portions of the cloud environments are to be tested. In some implementations, actions include receiving, by an intelligent quality assurance (iQA) platform, a desired state (DS) file including data indicative of a desired state of a cloud computing environment, triggering, by the iQA platform, an auto-discovery process to provide an actual state of the cloud computing environment based on cloud resources instantiated within the cloud environment, and application resources executing within the cloud environment, the auto-discovery process including retrieving first credentials to enable automated access to the cloud computing environment, determining, by the iQA platform, a delta between the actual state, and the desired state, and providing, by the iQA platform, a report including the delta.

Figure 1:
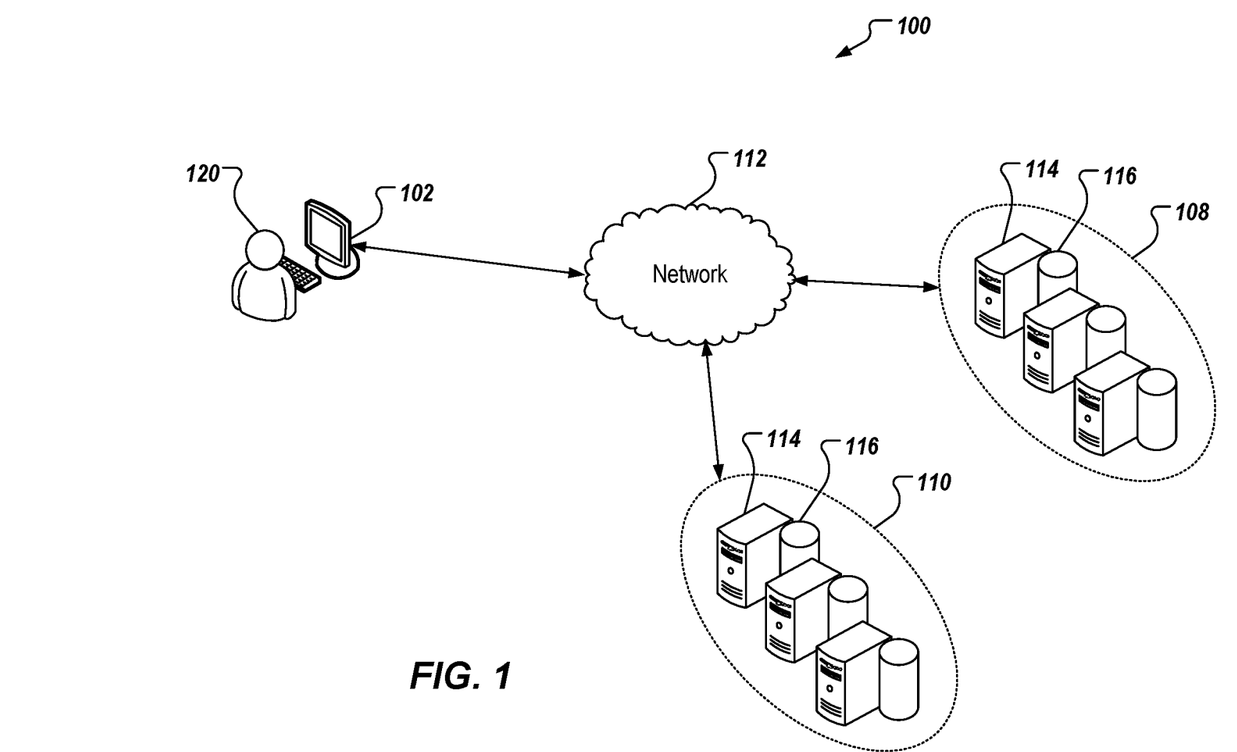
FIG. 1 depicts an example system that can execute implementations of the present disclosure.

FIG. 1 depicts an example system 100 that can execute implementations of the present disclosure. The example system 100 includes a computing device 102, a back-end system 108, a cloud environment 110, and a network 112. In some examples, the network 112 includes a local area network (LAN), wide area network (WAN), the Internet, or a combination thereof, and connects web sites, devices (e.g., the computing device 102), and back-end systems (e.g., the back-end system 108, the cloud environment 110). In some examples, the network 112 can be accessed over a wired and/or a wireless communications link. For example, mobile computing devices, such as smartphones can utilize a cellular network to access the network 112.

In the depicted example, the back-end system 108, and the cloud environment 110 each include at least one server system 114, and data store 116. In some examples, the at least one server system 114 hosts one or more computer-implemented services that users can interact with using computing devices. In some examples, the back-end system 108 can host a computer-implemented intelligent quality assurance (iQA) platform in accordance with implementations of the present disclosure. In some examples, the cloud environment 110 is analyzed for quality assurance by the iQA platform in accordance with implementations of the present disclosure.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

As introduced above, implementations of the present disclosure provide an iQA platform for auto-discovery of an actual state of a cloud environment, and validating the actual state against a desired state. In some implementations, and as described in further detail herein, the iQA platform provides for auto-discovery of a state of a cloud environment. In some examples, a state of a cloud environment is defined based on cloud resources (infrastructure), and/or applications of the cloud environment. For example, a cloud resources state can include computing devices (e.g., servers), network devices, and/or storage devices deployed in the cloud environment. An application state can include application installation(s), configuration(s), and interaction(s) (e.g., applications communicating with one another) within the cloud environment.

In some implementations, and as described in further detail herein, the iQA platform validates the actual state (e.g., an is state) against a desired state (e.g., a should be state). That is, the iQA platform assesses a degree, to which the actual state conforms to the desired state. In some examples, validation includes one or more tests (quality assurance (QA) tests) of the cloud environment. In some examples, the iQA platform, predicts particular areas of a cloud environment that are to be tested, and at what time, and/or frequency. In some examples, the predictions are based on historical test data.

Implementations of the present disclosure are described in further detail with reference to an example desired state referencing example infrastructure, and applications. It is contemplated, however, that implementations of the present disclosure are applicable to any appropriate infrastructure, and/or applications that can define a state. Further, the example desired state references Amazon Web Services (AWS) provided by Amazon as a cloud provider, as well as particular types of infrastructure, and applications. It is contemplated that implementations of the present disclosure can be realized with appropriate cloud providers (e.g., GCP provided by Google, Azure provided by Microsoft). The example desired state includes:

a) 5 servers of type m4.xlarge, OS RHEL7.1, attached external disk volumes of size 150 GB
b) 3 servers of type m5.xlarge, MS Windows Server 2012, attached external disk volumes of size 400 GB
c) Apache HTTP Server 2.4.(webserver) installed on machine having IP address 54.10.1.19
d) Security group attached to machine having IP address 54.10.1.19 has only HTTPs port number 443 open
e) AWS MySQL RDS created
f) Qlikview (application) installed on machine with IP address XYZ.
g) Qlikview (item f) above) data source is MySQL database (item e) above)

In accordance with implementations of the present disclosure, the desired state is provided as a computer-readable file (e.g., a DS file). In some examples, the DS file is provided as a Javascript object notation (JSON) template form. The DS file is parsed, and desired state information is stored in a database. In some examples, the DS file is parsed to provide a desired state database table that is populated with data of the DS file (e.g., in corresponding columns/rows). In some implementations, auto-discovery of a target cloud environment is initiated. The target cloud environment corresponds to the DS file (i.e., is the cloud environment, for which the DS file is created). In some examples, auto-discovery is triggered (e.g., manually, automatically). In some examples, auto-discovery is scheduled to run at a frequency.

In some implementations, credentials are retrieved from a secure storage location. In some examples, the secure storage location is provided by a custom built, proprietary vault service that internally uses a third party secrets management tool (e.g., HashiCorp Vault). Location of the credentials, and any information required to retrieve the credentials are provided in the database table (e.g., created from the DS file). In some examples, the credentials enable access to the cloud environment, enabling the iQA platform to query cloud resources provided in the cloud environment. In this manner, the cloud resources deployed within the cloud environment are discovered by the iQA platform. Details of the discovered cloud resources are stored in the database. Example cloud resources that can be deployed in a cloud environment, and discovered by the iQA platform can include, without limitation:

Instances/virtual machines (VMs), and respective states (e.g., running, stopped)
Type of instances (e.g., CPU, memory)
Operating service (OS) of instances
No. of disks volumes and respective sizes
Reserved instances Disks attached to the instances and those available but detached Disks encryption Allocated/unallocated public IP addresses in the network Storage buckets and respective properties (e.g., encryption, public access)

Virtual private clouds (VPCs) and subnets created

Security groups and ports open/blocked

Security groups attached to instances

Relational database services running

Identity and access management of users

In some implementations, the iQA platform auto-discovers application-level information. In some examples, one or more connections (e.g., Ssh connection for Linux, winrm connection for Windows) are established to remotely connect to servers and retrieve application-level data. The discovered application-level data is stored in the database. Example application-level data for a cloud environment, and discoverable by the iQA platform can include, without limitation:

Operating system (OS)

Services running on the instance/VM (to verify software is working properly)

Software installed by searching executable files and folder locations

Installed software by running software specific test commands

Installed drivers

Connectivity with databases

Active directory (AD) integration

Application user access permissions

In some implementations, one or more QA tests are performed on the cloud environment. Example QA tests can include, without limitation, querying a database to perform validations against target states, and store results (e.g., passes, fails), and querying a database to identify any additional cloud resources, and/or applications (e.g., additional to those defined in the DS file), and store difference in the database. Validation results and state differences data are consumed by other applications for reporting dashboards, and/or providing alerts, as described in further detail herein.

Figure 2:
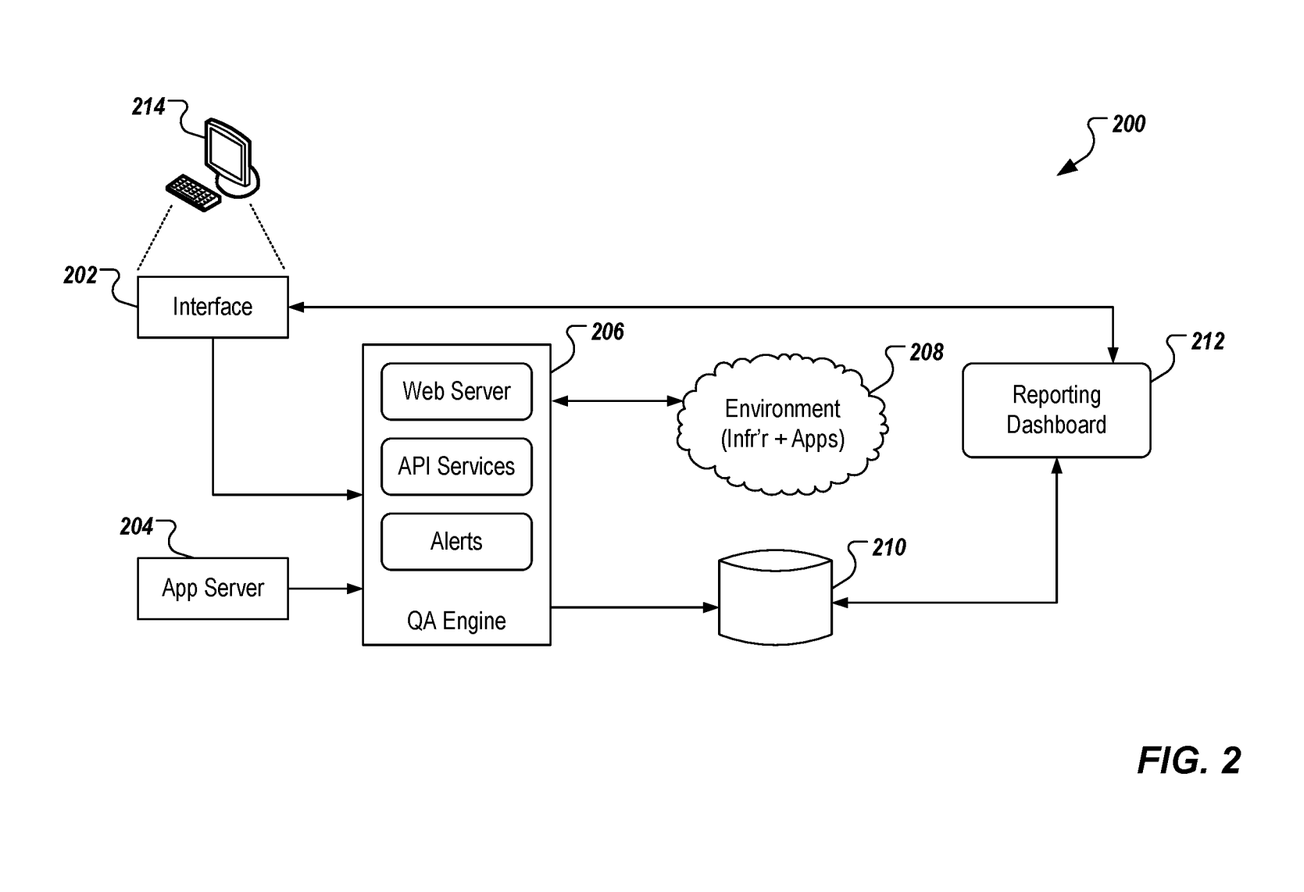
FIG. 2 depicts an example conceptual architecture in accordance with implementations of the present disclosure.

FIG. 2 depicts an example conceptual architecture 200 in accordance with implementations of the present disclosure. In the depicted example, the conceptual architecture 200 includes an interface 202, an application server 204, a QA engine 206, a cloud environment 208 (e.g., the cloud environment 110 of FIG. 1), a database 210, and a reporting dashboard 212. In some examples, one or more components of the conceptual architecture 200 are hosted on one or more back-end systems (e.g., the back-end system 108 of FIG. 1). In some examples, the interface is provided as a computer-executable program (e.g., web browser) executed on a computing device 214 (e.g., the computing device 102 of FIG. 1), and enables a user (e.g., the user 120) to interact with the iQA platform of the present disclosure. For example, the user can upload a DS file to the QA engine 206 through the interface 202 (e.g., fill in and submit a web form to define the desired state recorded in the DS file).

In some implementations, the user (e.g., through the interface 202), or the application server (e.g., for auto-triggering, scheduling) submits the DS file for the desired state of the cloud environment 208 (e.g., expected infrastructure and applications of the cloud environment 208). In response, the QA engine 206 retrieves credentials, and auto-discovers the actual state of the cloud environment 208. In some implementations, the QA engine executes QA tests, and results in the database 210. In some examples, QA tests are executed after completion of the auto-discovery process. In some examples, QA tests are executed in parallel with the auto-discovery process (e.g., executed on resources/applications as they are auto-discovered). Based on the results data, various reports, and dashboards can be provided through the reporting dashboard 212 (e.g., for viewing through the interface 202). Historical test results data is stored in the database 210 for comparison with results of current QA tests, and/or other previously executed QA tests. In some examples, one or more alerts can be triggered based on failures (e.g., a failure that is determined to be a critical failure).

Figure 3:
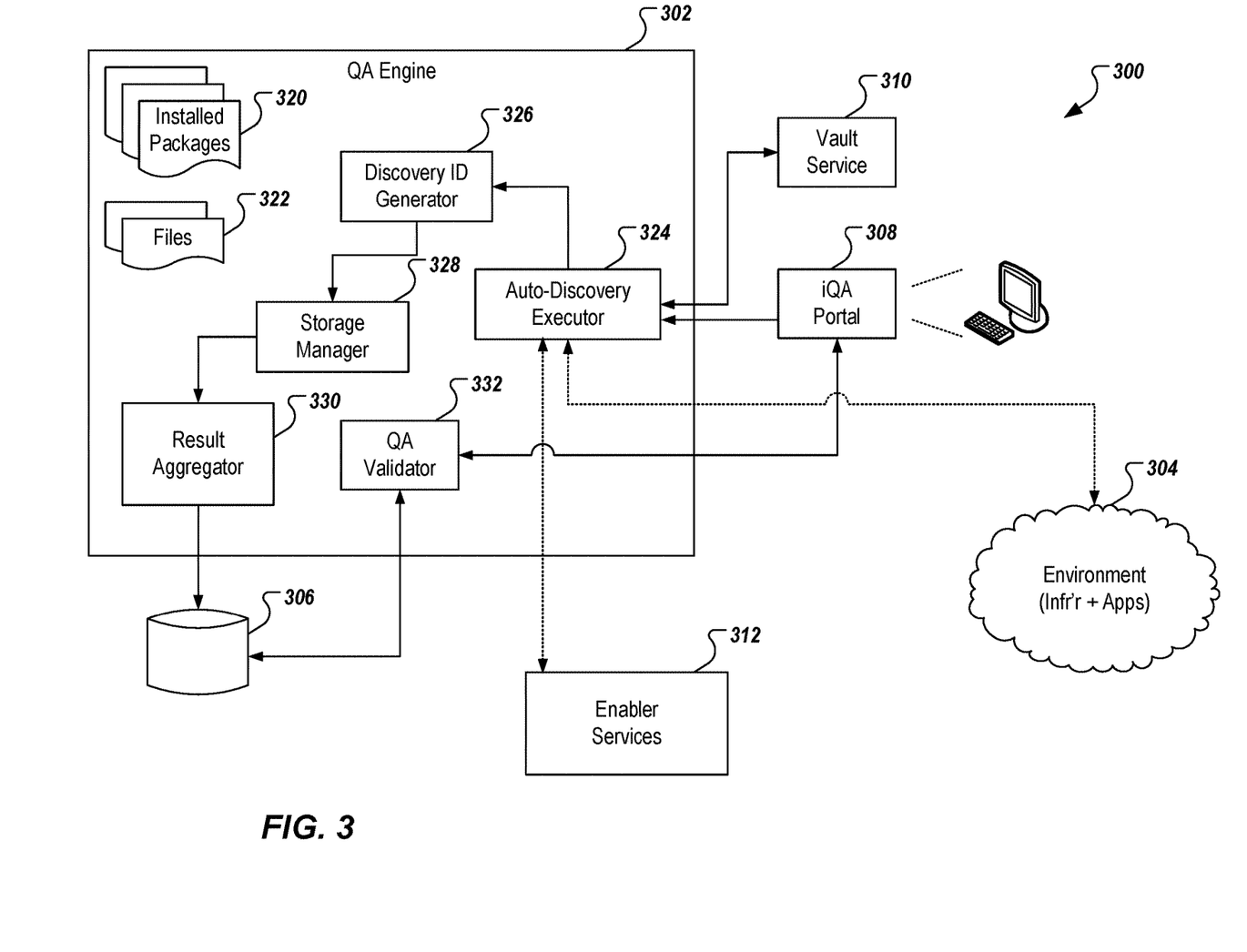
FIG. 3 depicts an example architecture in accordance with implementations of the present disclosure.

FIG. 3 depicts an example architecture 300 in accordance with implementations of the present disclosure. The example architecture 300 includes a QA engine 302 (e.g., the QA engine 206 of FIG. 2), a cloud environment 304 (e.g., the cloud environment 208 of FIG. 2), a database 306, and an iQA portal 308 (e.g., the interface 202 of FIG. 2). The example architecture 300 also includes a vault service 310, and one or more enabler services. In some examples, and as described herein, the vault service 310 stores credentials that enable access to cloud resources, and applications provided in the cloud environment 304. In some examples, the one or more enabler services 312 include third-party services that support operations of the cloud environment 304. Example enabler services 312 can include, without limitation, anti-virus services, and monitoring services. For example, the cloud environment 304 can leverage anti-virus service provided by a third-party to mitigate intrusion of computer viruses into the cloud environment 304.

In the example of FIG. 3, the QA engine 302 includes installed packages 320, and files 322. In some implementations, the installed packages 322 enable QA engine to perform its operations. Example installed packages 322 can include clients used to call APIs of the cloud environment 304, and retrieve information from the cloud environment. For example, command line interfaces (CLIs) enable the QA engine 302 to interface with cloud environment 304, and/or resources within the cloud environment 304. Example CLIs include, without limitation, AWS CLI (e.g., used to call AWS API), and Azure CLI (e.g., used to call Azure API). In some examples, installed packages 322 include packages used to execute scanning scripts, and/or validation scripts. In some examples, the files 322 includes scripts, and/or data that are used for validation testing. For example, a validation test can include executing a visualization job, which requires data to be loaded to perform the test. The files 322 can provide the scripts and relevant data for executing the job as part of the validation test.

With continued reference to FIG. 3, the QA engine 302 also includes an auto-discovery executor 324, a discovery ID generator 326, a storage manager 328, a result aggregator and DAO layer 330, and a QA validator 332. In some implementations, the auto-discovery executor 324 performs auto-discovery activities described herein. For example, in response to triggering of auto-discovery, the auto-discovery executor 324 processes data provided from a DS file to determine a particular cloud environment (e.g., the cloud environment 304), and any external services (e.g., the enabler services 312), and retrieve requisite credentials for such (e.g., from the vault service 310). In some implementations, the auto-discovery executor 324 scans the cloud environment 304, and retrieves a list of cloud resources, and application-level information. In some examples, the list can provide detailed data including, without limitation, instances in the cloud environment, IP addresses, security groups, instance types, VPCs, sub-nets, certificates, and the like, storage, and types of storage (e.g., public, private, encrypted).

In some implementations, the list identifies applications, and application servers configured within the cloud environment 304. In some examples, the auto-discovery executor 324 retrieves any credentials needed to access the applications, and/or application servers identified in the list. In some implementations, the auto-discovery executor 324 accesses the applications, and/or application servers using the credentials to receive application-level information. For example, application-level information can include, without limitation, application types, interconnections between applications, user accessibility for applications (e.g., which users have what access to an application).

In some implementations, as cloud resources, and application-level information are discovered, they are stored in a database table within the database 306. For example, the auto-discovered cloud resources, and application-level data can be stored in an actual state database table. In some examples, the discovery ID generator 326 provides unique identifiers for the auto-discovered data, which unique identifier can be used for traceability, and/or subsequent auditing. In some examples, the storage manage 328 receives the to-be-stored data with respective unique identifiers, and provides it to the result aggregator 330. In some examples, the auto-discovered data is received in JSON format, which the storage manager 328 stores on the file system/disk (e.g., one JSON file for each parallel execution performed by the auto-discovery executor 324). In some implementations, the result aggregator 330 adds the auto-discovered data to the actual state database table within the database 306 as it is received from the auto-discovery executor 324.

In some implementations, the QA validator 332 determines a difference (delta), if any, between the actual state, and the desired state. For example, the QA validator can compare the data of the desired state database table to data of the actual state database, and determine any differences. Referring to the example desired state above, an example actual state can indicate that there are two servers of type m5.xlarge, six servers of type m4.xlarge, and a Qlikview (application) installed on machine with IP address QRS. In comparing the actual state to the desired state, a delta can be provided indicating that there is one-to-few servers of type m5.xlarge, one-to-many servers of type m4.xlarge, and a Qlikview (application) installed on machine with IP address QRS instead of IP address XYZ. In some examples, a report can be provided (e.g., displayed through the iQA portal 308), which provides the delta.

In some implementations, the QA validator 332 coordinates execution of one or more validation tests on the computing environment 304. In some examples, the QA validator 332 retrieves a file 322, which includes one or more scripts, and test data for executing the one or more validation tests. An example validation test can include, without limitation, testing a visualization application by providing data, for which a visualization is to be provided, and executing a script, which instructs the application in providing the visualization. In some examples, the visualization can be displayed (e.g., within the iQA portal 308). Another example validation test can include, without limitation, prompting an application to generate one or more logs, and determining where the application stored corresponding log files (e.g., determining whether the logs files are stored in an appropriate location per the desired state).

In some implementations, historical data can be maintained within the database 306 for the cloud environment 304. In some examples, the historical data can be processed to determine whether any patterns are present. Example patterns can represent occurrences of an actual state of the cloud environment 304 departing from the desired state of the cloud environment 304. For example, it can be determined that, after particular occurrences (e.g., upgrade of an application), the actual state diverges from the desired state. As another example, it can be determined that the actual state tends to diverge from the desired state after X number of days. In some examples, one or more identified patterns can be used to trigger auto-discovery, and/or schedule auto-discovery (e.g., on the full cloud computing environment, or a particular portion of the cloud computing environment). For example, in response to updating of an application, the auto-discovery can be triggered to determine whether the actual state diverged from the desired state. As another example, auto-discovery is scheduled for every X days.

In some implementations, artificial intelligence (AI) techniques could be used in pattern detection. In some examples, data records of test failures occurring for each cloud environment scan are available in the database. The failures can be tagged/categorized into multiple failure possibility buckets. In some examples, each bucket corresponds to a different area within the cloud environment. In some implementations, a failure model is developed based on occurrences of the failures, in which a ML algorithm is trained to predict which area of cloud environment should be scanned at a higher frequency compared to a full scan. In some examples, a supervised learning algorithm (e.g., linear regression) can be implemented. In some implementations, a full auto-discovery scan can be scheduled weekly. However, and as a non-limiting example, if a pattern identifies an active directory possibility bucket failures occurrence is high, the schedule of scanning only active directory possibility bucket can be set at higher frequency (e.g., twice daily).

Figure 4:
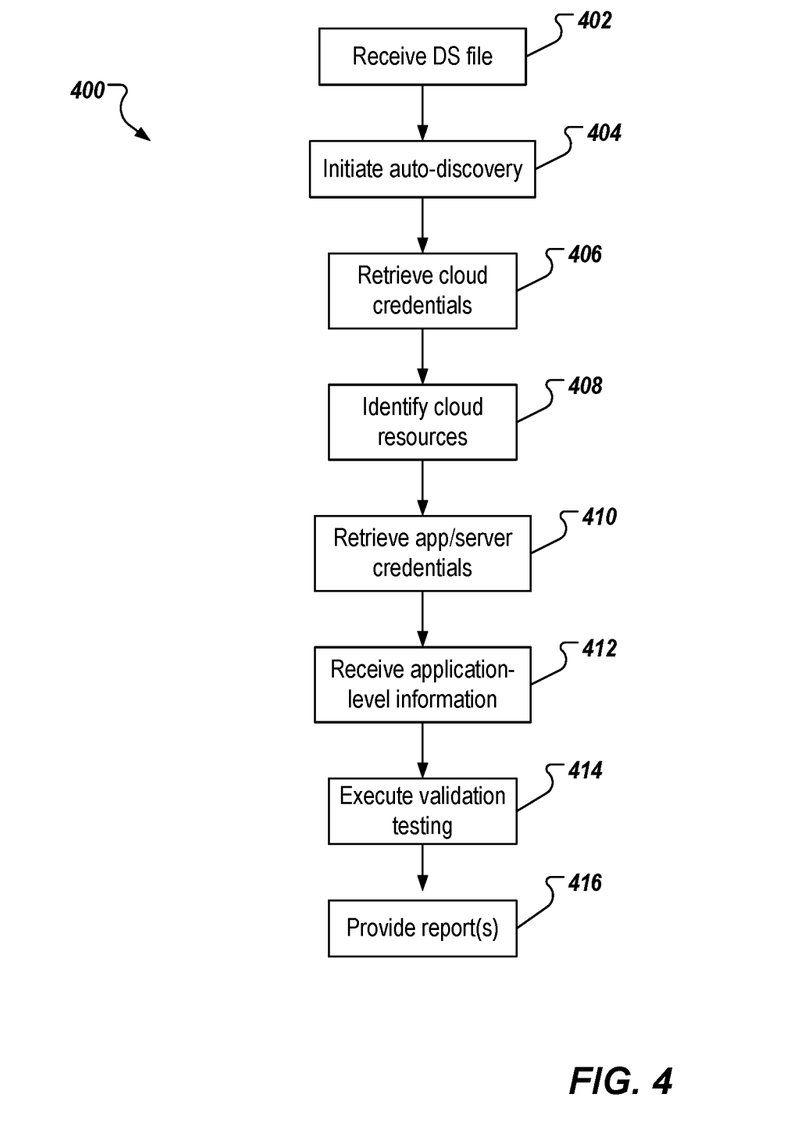
FIG. 4 depicts an example process that can be executed in implementations of the present disclosure.

FIG. 4 depicts an example process 400 that can be executed in implementations of the present disclosure. In some examples, the example process 400 is executed by one or more computer-executable programs executed by one or more computing devices.

A DS file is received (402). For example, the QA engine 302 receives the DS file (e.g., from a user, from an application server). Auto-discovery of the cloud environment 304 is initiated (404). For example, auto-discovery of the cloud environment 304 is initiated in response to receipt of the DS file. In some examples, auto-discovery is initiated by a user, or an application server. In some examples, auto-discovery is initiated based on a schedule.

Cloud credentials are retrieved (406). For example, the auto-discovery executor 324 of the QA engine 302 retrieves credentials to the cloud environment 304 from the vault service 310. Cloud resources are identified (408). For example, the auto-discovery executor 324 accesses the cloud environment 304 using the credentials provided from the vault service 310, and queries the cloud environment 304 to discover (identify) resources (e.g., computing, applications) provided in the cloud environment 304. That is, the auto-discovery executor 324 queries the cloud environment 304 to determine an actual state of the cloud environment 304 (i.e., the particular components and configurations actually implemented in the cloud environment 304).

Application and/or server credentials are retrieved (410). For example, the auto-discovery executor 324 of the QA engine 302 retrieves credentials to application, and/or server resources implemented within the cloud environment 304 from the vault service 310. That is, the auto-discovery executor 324 retrieves credentials for the application, and/or server resources identified in the actual state of the cloud environment.

Application-level information is retrieved (412). For example, the auto-discovery executor 324 of the QA engine 302 accesses the application(s), and/or server resources implemented within the cloud environment 304 using the credentials retrieved from the vault service 310. In some examples, the auto-discovery executor 324 receives application-level information indicating configurations of applications, and/or servers, and any interconnections (e.g., between applications).

Validation testing is executed (414). For example, the QA validator 332 of the QA engine 302 executes one or more validation tests based on one or more files 322. In some examples, the QA validator 332 determines a difference between the desired state, and the actual state of the computing environment. One or more reports are provided (416). For example, The QA engine 302 provides one or more reports for display through the iQA portal 308. In some examples, a report can include a comparison between the desired state, and the actual state. In some examples, the report includes results of the one or more validation tests.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the to be filed claims.

What is claimed is:

1. A computer-implemented method performed by an intelligent quality assurance (iQA) platform executed by one or more processors, the computer-implemented method comprising:
   receiving a desired state (DS) file from a client device, the DS file comprising data indicative of a desired state of a cloud environment, wherein the desired state of the cloud environment comprises i) a set of desired cloud resources and application resources and ii) desired configurations of the set of desired cloud resources and application resources in the cloud environment;
   storing the desired state of the cloud environment into a database;
   retrieving based on data provided in the DS file, first credentials corresponding to the cloud environment from a vault service, where the first credentials are stored, to enable automated access to the cloud environment;
   accessing the cloud environment using the first credentials;
   triggering an auto-discovery process to obtain an actual state of the cloud environment including i) actual configurations of cloud resources instantiated within the cloud environment, and ii) actual configurations of application resources executing within the cloud environment;
   storing the actual state of the cloud environment into the database;
   performing a quality assurance (QA) test that determines a difference between the actual state of the cloud environment, and the desired state of the cloud environment;
   providing a report comprising the difference;
   storing the difference into the database, wherein the database also stores historical data of previously executed QA tests for the cloud environment;
   identifying, based on the historical data in the database, patterns of occurrences of the actual state of the cloud environment departing from the desired state of the cloud environment,
     wherein the patterns comprise one or more events that are associated with the occurrences of the actual state of one or more areas of the cloud environment departing from the desired state of the one or more areas of the cloud environment;
   predicting to-be-tested areas of the cloud environment where the occurrences of the actual state of the cloud environment departing from the desired state of the cloud environment are high and scheduling a corresponding frequency of scanning the to-be tested areas; and
   triggering the auto-discovery process that scans the to-be-tested areas at the corresponding frequency.

2. The method of claim 1, wherein the auto-discovery process further comprises receiving second credentials that enable automated access to one or more applications, and/or application servers of the cloud environment, the one or more applications, and/or application servers being identified based on auto-discovery of cloud resources within the cloud environment that is accessed based on the first credentials.

3. The method of claim 2, wherein the second credentials are stored in and retrieved from the vault service.

4. The method of claim 1, wherein the auto-discovery process is triggered in response to one of a schedule, an occurrence of the one or more events an event, or receipt of the DS file.

5. The method of claim 1, wherein determining the difference between the actual state of the cloud environment and the desired state of the cloud environment can also be done by parsing the DS file to provide a desired state database table, and comparing the desired state database table to an actual state database table resulting from the auto-discovery process.

6. The method of claim 1, wherein the DS file comprises a Javascript object notation (JSON) file.

7. A non-transitory computer-readable storage medium coupled to one or more processors and having instructions stored thereon which, when executed by the one or more processors, cause the one or more processors to perform operations performed by an intelligent quality assurance (iQA) platform executed by the one or more processors, the operations comprising:
   receiving a desired state (DS) file from a client device, the DS file comprising data indicative of a desired state of a cloud environment, wherein the desired state of the cloud environment comprises i) a set of desired cloud resources and application resources and ii) desired configurations of the set of desired cloud resources and application resources in the cloud environment;
   storing the desired state of the cloud environment into a database;
   retrieving based on data provided in the DS file, first credentials corresponding to the cloud environment from a vault service, where the first credentials are stored, to enable automated access to the cloud environment;
   accessing the cloud environment using the first credentials;

triggering an auto-discovery process to obtain an actual state of the cloud environment including i) actual configurations of cloud resources instantiated within the cloud environment, and ii) actual configurations of application resources executing within the cloud environment;

storing the actual state of the cloud environment into the database;

performing a quality assurance (QA) test that determines a difference between the actual state of the cloud environment, and the desired state of the cloud environment;

providing a report comprising the difference;

storing the difference into the database, wherein the database also stores historical data of previously executed QA tests for the cloud environment;

identifying based on the historical data in the database, patterns of occurrences of the actual state of the cloud environment departing from the desired state of the cloud environment, wherein the patterns comprise one or more events that are associated with the occurrences of the actual state of one or more areas of the cloud environment departing from the desired state of the one or more areas of the cloud environment;

predicting to-be-tested areas of the cloud environment where the occurrences of the actual state of the cloud environment departing from the desired state of the cloud environment are high and scheduling a corresponding frequency of scanning the to-be tested areas; and triggering the auto-discovery process that scans the to-be-tested areas at the corresponding frequency.

8. The non-transitory computer-readable storage medium of claim 7, wherein the auto-discovery process further comprises receiving second credentials that enable automated access to one or more applications, and/or application servers of the cloud environment, the one or more applications, and/or application servers being identified based on auto-discovery of cloud resources within the cloud environment that is accessed based on the first credentials.

9. The non-transitory computer-readable storage medium of claim 8, wherein the second credentials are stored in and retrieved from the vault service.

10. The non-transitory computer-readable storage medium of claim 7, wherein the auto-discovery process is triggered in response to one of a schedule, an occurrence of the one or more events, or receipt of the DS file.

11. The non-transitory computer-readable storage medium of claim 7, wherein determining the difference between the actual state of the cloud environment and the desired state of the cloud environment can also be done by parsing the DS file to provide a desired state database table, and comparing the desired state performing a quality assurance (QA) test that determines a difference between the actual state of the cloud environment, and the desired state of the cloud environment;

providing a report comprising the difference;

storing the difference into the database, wherein the database also stores historical data of previously executed QA tests for the cloud environment;

identifying, on the historical data in the database, patterns of occurrences of the actual state of the cloud environment departing from the desired state of the cloud environment, wherein the patterns comprise one or more events that are associated with the occurrences of the actual state of one or more areas of the cloud environment departing from the desired state of the one or more areas of the cloud environment;

predicting to-be-tested areas of the cloud environment where the occurrences of the actual state of the cloud environment departing from the desired state of the cloud environment are high and scheduling a corresponding frequency of scanning the to-be tested areas; and triggering the auto-discovery process that scans the to-be-tested areas at the corresponding frequency.

12. The non-transitory computer-readable storage medium of claim 7, wherein the DS file comprises a Javascript object notation (JSON) file.

13. A system, comprising:

one or more processors; and a computer-readable storage device coupled to the one or more processors and having instructions stored thereon which, when executed by the one or more processors, cause the one or more processors to perform operations performed by an intelligent quality assurance (iQA) platform executed by the one or more processors, the operations comprising:

receiving a desired state (DS) file from a client device, the DS file comprising data indicative of a desired state of a cloud environment, wherein the desired state of the cloud environment comprises i) a set of desired cloud resources and application resources and ii) desired configurations of the set of desired cloud resources and application resources in the cloud environment;

storing the desired state of the cloud environment into a database;

retrieving based on data provided in the DS file, first credentials corresponding to the cloud environment from a vault service, where the first credentials are stored, to enable automated access to the cloud environment;

accessing the cloud environment using the first credentials;

triggering an auto-discovery process to obtain an actual state of the cloud environment including i) actual configurations of cloud resources instantiated within the cloud environment, and ii) actual configurations of application resources executing within the cloud environment;

storing the actual state of the cloud environment into the database.

14. The system of claim 13, wherein the auto-discovery process further comprises receiving second credentials that enable automated access to one or more applications, and/or application servers of the cloud environment, the one or more applications, and/or application servers being identified based on auto-discovery of cloud resources within the cloud environment that is accessed based on the first credentials.

15. The system of claim 14, wherein the second credentials are stored in and retrieved from the vault service, database table to an actual state database table resulting from the auto-discovery process.

16. The system of claim 13, wherein the auto-discovery process is triggered in response to one of a schedule, an occurrence of the one or more events, or receipt of the DS file.

17. The system of claim 13, wherein determining the difference between the actual state of the cloud environment and the desired state of the cloud environment can also be done by parsing the DS file to provide a desired state database table, and comparing the desired state database table to an actual state database table resulting from the auto-discovery process.

18. The system of claim 13, wherein the DS file comprises a Javascript object notation (JSON) file.

* * * * *